May 15, 1923.
L. HAEGE
ANIMAL TRAP
Filed Oct. 4, 1922
1,454,998
2 Sheets—Sheet 1
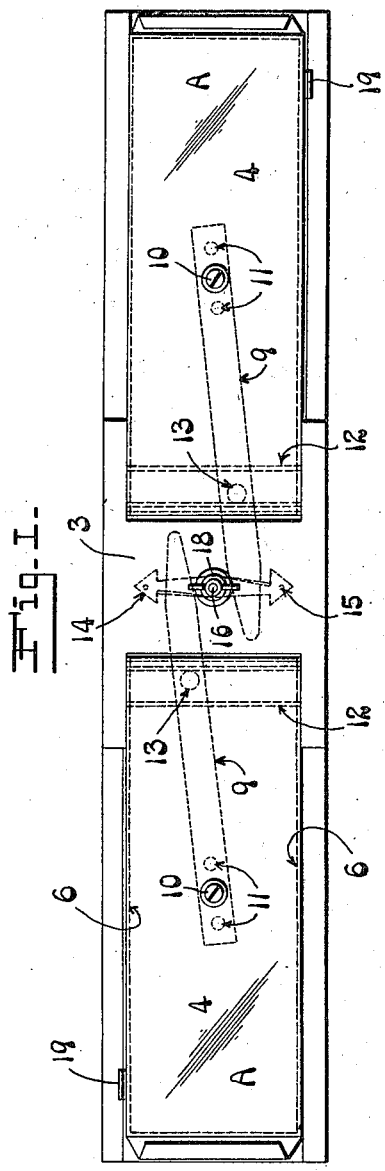
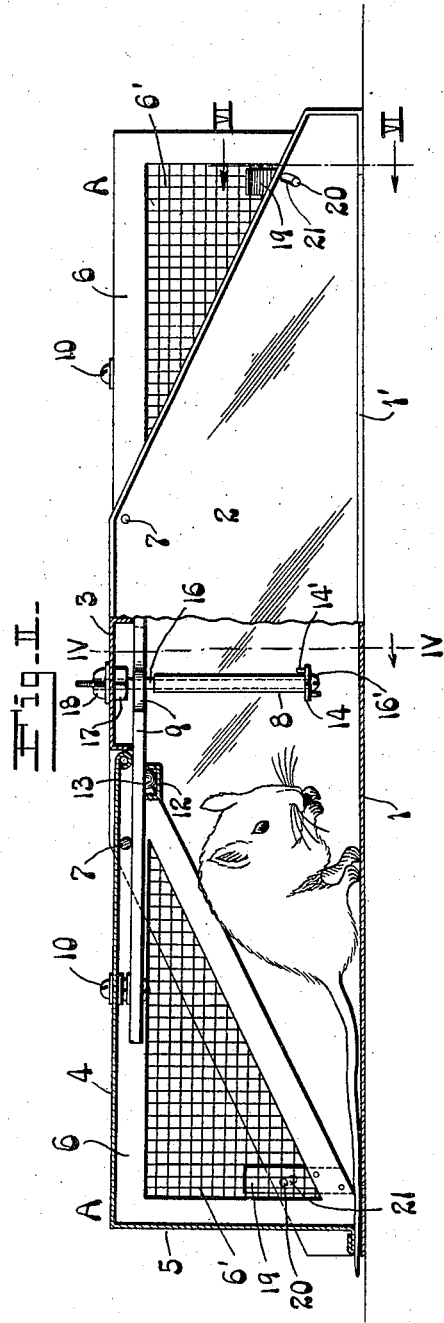
Inventor.
Louis Haege,
By Cook & McCauley
His Attorneys.

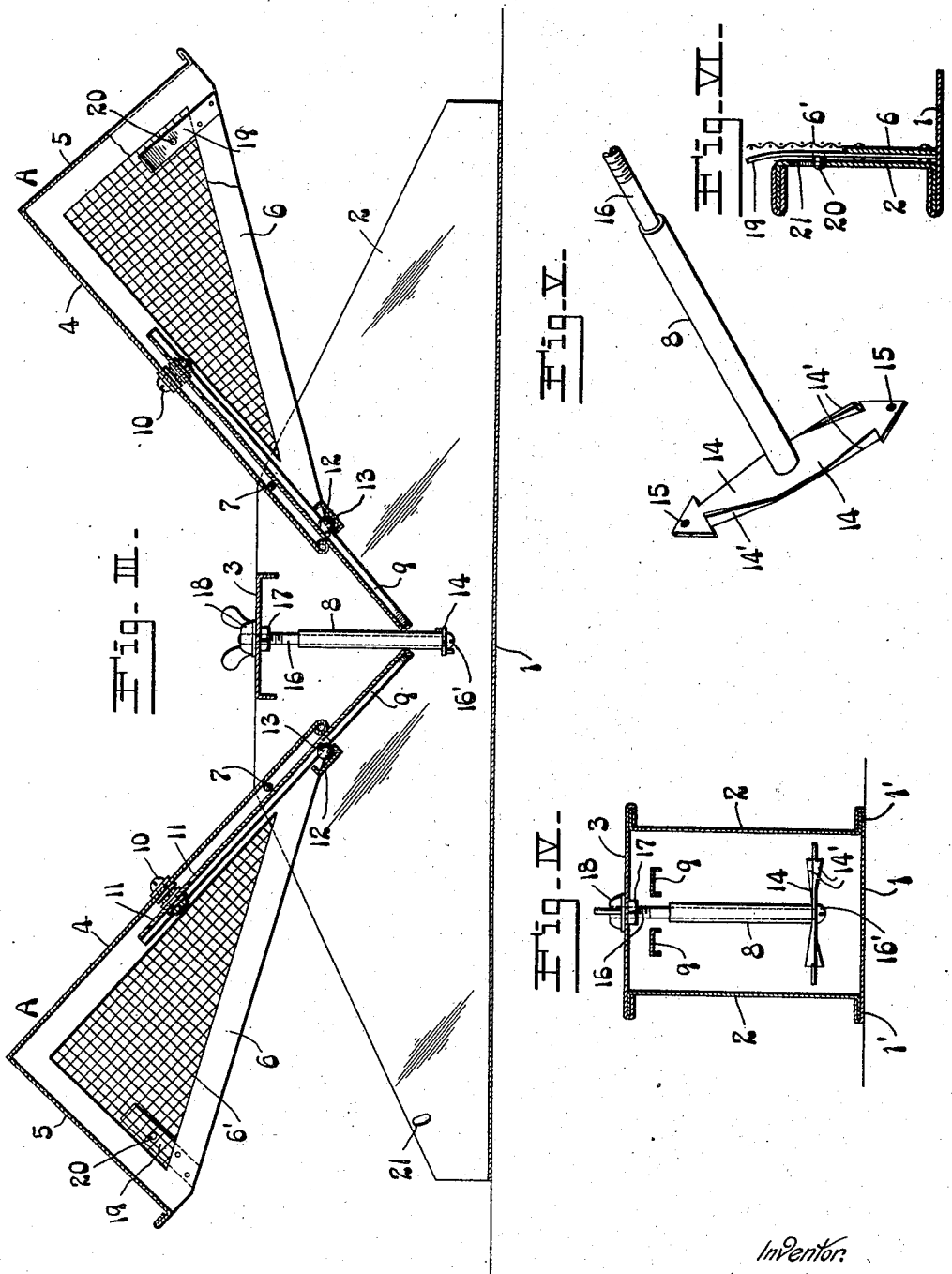

Patented May 15, 1923.

1,454,998

UNITED STATES PATENT OFFICE.

LOUIS HAEGE, OF NEW MEMPHIS, ILLINOIS.

ANIMAL TRAP.

Application filed October 4, 1922. Serial No. 592,232.

*To all whom it may concern:*

Be it known that I, LOUIS HAEGE, a citizen of the United States of America, a resident of New Memphis, in the county of Clinton and State of Illinois, have invented certain new and useful Improvements in Animal Traps, of which the following is a full, clear, and exact description, reference being had to the accompanying drawings, forming a part of this specification.

This invention relates to improvements in animal traps, the main object being to provide a simple and effective trap for rats, rabbits and other animals. A further object is to produce a sensitive tripping device consisting of a few simple elements cooperating with each other to retain the trap in its open position. Another object is to provide a simple automatic means for locking the trap door when it moves to its closed position.

With the foregoing and other objects in view, the invention comprises the novel construction, combination and arrangement of parts hereinafter more specifically described and illustrated in the accompanying drawings wherein is shown the preferred embodiment of the invention. However, it is to be understood that the invention comprehends changes, variations and modifications which come within the scope of the claims hereunto appended.

Briefly stated, the trap herein disclosed comprises a housing having a door and a trippable arm engaging a rotary tripping member to hold the door in its open position. The trippable arm is preferably pivoted to the door and its free end contacts with the periphery of the rotary tripping member in such a manner that a rotary motion of the tripping member will displace the arm to release the door. The tripping member is turned through the medium of a bait-holder. When the door is released it drops to its open position and is then automatically locked. The trap may be provided with a pair of doors, and either door may be used independently of the other, as will be hereafter described.

Fig. I is a top view of a trap embodying the features of this invention, the doors being shown in their closed positions.

Fig. II is a side elevation of the trap, partly in section, with the doors in their closed positions.

Fig. III is a longitudinal section showing the doors in their open positions, a corner of one of the doors being shown in elevation to illustrate the spring latch.

Fig. IV is a vertical section taken approximately on the line IV—IV in Fig. II.

Fig. V is a perspective view of the rotary tripping member and the bait-holder extending therefrom.

Fig. VI is an enlarged fragmentary section taken approximately on the line VI—VI in Fig. II, and showing the automatic spring latch.

The trap herein shown comprises a housing provided with a floor 1, side walls 2 extending upwardly from the floor, and a bridge 3 located at the middle of the trap and connecting the upper margins of said side walls. The housing may be made of sheet metal bent and folded as shown most clearly in Fig. IV to unite the several parts, and the base flanges 1' can, if desirable, be nailed to a floor or base board (not shown).

The housing is open at both ends and provided with a pair of doors A adapted to close the ends. Each door comprises a top wall 4, an end wall 5 and a pair of triangular side walls 6, the latter being in the form of triangular frames to which screens 6' are secured. Each door is pivoted at 7 to the side walls of the housing, the pivot being located between the ends of the door so that the trap will be open at the top as well as at the ends when the doors are open, as shown in Fig. III, the inner ends of the doors being separated from the bridge 3 to permit an animal to enter through the top of the housing.

The tripping device comprises a rotary tripping member 8 in the form of a tube located within the trap at the middle thereof, and trippable arms 9 extending from the inner ends of the doors to engage the periphery of the rotary tube 8. 10 designates pivots in the form of bolts extending through the top walls 4 of the doors, each bolt 10 being adapted to pass through any one of a series of holes 11 in one of the arms 9, so as to pivotally secure the arm. Each arm 9 can be adjusted longitudinally to locate either one of its holes 11 in alinement with the pivot bolt 10, and by making adjustments of this kind the doors can be held at different elevations, it being understood that the free end of each arm 9 merely contacts with the rotary tube 8 to hold a door in its open position. Adjustments of this kind are desirable to set the trap for different animals, and to locate the trap in close quarters where there are obstructions adjacent to the top of the trap.

Channels 12 are carried by the doors to form seats for anti-friction balls 13, each ball being confined between and engaged with an arm 9 and a channel 12. As shown by Fig. I, the free ends of the pivoted arms 9 are rounded, and when the trap is set as shown in Fig. III the rounded ends engage the periphery of the rotary tube 8. When the tube is turned in either direction, motion will be transmitted from the tube to the arms 9 so as to turn the arms on their pivots, thereby displacing the arms from the tube and permitting the doors to drop by gravity to their closed positions. When the trap is set as shown in Fig. III, the doors tend to drop by gravity, and the weight of the doors is supported partly by the pivots 7 and partly by the arms 9 which engage the ball bearings 13 to prevent undue friction between the arms and the doors, one of the objects being to permit free pivotal movement of said arms 9, so that they can be readily displaced by the motion transmitted from the rotary tube 8.

The bait-holder comprises arms 14 rigid with the rotary tube 8 and provided with pointed ends to receive the bait. Flanges 14' extend vertically from the arms 14 to prevent inward displacement of the bait which is to be secured on the spear-like ends of the arms. These ends may be perforated as shown at 15 (Figs. I and V) to receive a string attached to the bait.

The vertical tube 8 and its horizontal arms 14 are rotatably supported by a vertical rod 16 passing through the tube and having a head 16' at its lower end to limit the downward motion of the tube on the rod. The upper end of the supporting rod 16 extends through bridge 3, and this end is threaded to receive the nuts 17 and 18, the nut 17 being engaged with the bottom of the bridge while the nut 18 is engaged with the top. The rotary tube 8 and its bait-holding arms are thus adjustably secured to the trap, and they can be readily removed therefrom to secure the bait to the arms 14.

In trapping some animals it is desirable to have both doors open, as shown in Fig. III, and in this event the trippable arms 9 will engage diametrically opposite points on the tube 8 so as to support the doors without causing undue friction between the tube 8 and supporting rod 16. However, in trapping other animals it is desirable to open only one door, and it will be apparent that the tripping mechanism permits either door to be used independently of the other, for the rotary tube 8 will cooperate with either one or both of the arms 9.

I will now describe the means for automatically locking the doors when they move to their closed positions. 19 designates springs having their lower ends rigidly secured to the respective doors, each spring being provided with a locking pin 20 adapted to pass through an elongated slot 21 in the housing, as shown most clearly in Figs. II and VI. Before a door reaches its lowermost position, the pin 20 enters slot 21 to lock the door. Consequently, the automatic locking device will be effective even though an obstruction of some kind prevents the door from moving to its lowermost position. The object of this is suggested in Fig. II, wherein the tail of an animal is shown between the door and the housing while the door is locked by a pin 20 in the slot 21.

I claim:

1. An animal trap comprising a housing provided with a door, a rotary tripping member, a trippable member pivoted to said door and engaged with the periphery of said rotary tripping member to retain the door in its open position, said trippable member being movable on its pivot to pass from said tripping member, and a bait holder whereby said rotary tripping member is turned to release said trippable member.

2. An animal trap comprising a housing provided with a door, a rotary tripping member, a trippable member cooperating with said rotary tripping member to retain the door in its open position, said trippable member being free to turn and thereby pass from said rotary tripping member, and said trippable member being in contact with said rotary tripping member so as to turn in response to rotary movements of said tripping member, and a bait holder whereby rotary motion is transmitted to said rotary tripping member.

3. An animal trap comprising a housing provided with a door, a rotary tripping member, a trippable member pivoted to said door and cooperating with said rotary tripping member to retain the door in its open position, said trippable member being free to turn on its pivot and thereby pass from said rotary tripping member, and said trippable member being in contact with the periphery of said rotary tripping member so as to turn in response to rotary movements of said tripping member, and a bait holder whereby rotary motion is transmitted to said rotary tripping member.

4. An animal trap comprising a housing provided with a door, a trippable arm pivoted to said door, a rotary tripping member cooperating with said trippable arm to retain the door in its open position, said rotary tripping member being in contact with the free end of said trippable arm to transmit rotary motion from the tripping member to the arm, thereby displacing said arm from said rotary tripping member, and a bait holder extending from said rotary tripping member.

5. An animal trap comprising a housing provided with a door, a rod arranged within and secured to said housing, a tube rotatably mounted on said rod, a bait holder extending from the rotatable tube, and a trippable arm pivoted to said door and cooperating with said tube to retain the door in its open position, said tube being in driving contact with the free end of said trippable arm to transmit rotary motion from said tube to said arm, thereby displacing said arm from said tube.

6. An animal trap comprising a housing provided with a pair of doors, a pair of trippable members pivoted to the respective doors, a rotary tripping member contacting with both of said trippable members to retain the doors in their open positions, and a bait holder whereby said rotary tripping member is turned to release both of said trippable members.

7. An animal trap comprising a housing open at both ends, a pair of doors hinged to said housing and adapted to close said ends, a pair of trippable arms pivoted to the respective doors, a rotary tripping member interposed between and in driving contact with the free ends of said pivoted arms, said tripping member being rotatable in opposite directions to displace said arms from the said tripping member, and a bait holder extending from said tripping member.

8. An animal trap comprising a housing provided with a door, a rotary tripping member, a trippable member cooperating with said rotary tripping member to retain the door in its open position, said trippable member being pivoted to the door and adjustable relative thereto so as to hold the door at different elevations, said trippable member being in driving contact with said rotary tripping member so as to turn and pass from the tripping member in response to rotary movements of said tripping member, and a bait holder whereby rotary motion is transmitted to said tripping member.

9. An animal trap comprising a housing provided with a door, a rotary tripping member, a trippable member pivoted to said door and engaged with the periphery of said rotary tripping member to retain the door in its open position, an anti-friction bearing interposed between said trippable member and a part of the door to permit free pivotal movement of said trippable member, said trippable member being movable on its pivot to pass from said tripping member, and a bait holder whereby said rotary tripping member is turned to release said trippable member.

10. An animal trap comprising a housing provided with a door, a trippable arm pivoted to said door, a rotary tripping member cooperating with said trippable arm to retain the door in its open position, said rotary tripping member being in contact with the free end of said trippable arm to transmit rotary motion from the tripping member to the arm, thereby displacing said arm from said rotary tripping member, a bait holder extending from said rotary tripping member, and a vertically adjustable support for said bait holder and tripping member.

11. An animal trap comprising a housing provided with a door, a rod arranged within said housing, said rod having a threaded upper end adjustably secured to and removable from said housing, a tube rotatably mounted on said rod, a bait holder extending from the rotatable tube, a trippable arm pivoted to said door and cooperating with said tube to retain the door in its open position, said tube being in driving contact with the free end of said trippable arm to transmit rotary motion from said tube to said arm, thereby displacing said arm from said tube, and an operating arm extending from said tube.

In testimony that I claim the foregoing I hereunto affix my signature.

LOUIS HAEGE.